United States Patent
Lee et al.

(10) Patent No.: US 11,102,708 B2
(45) Date of Patent: Aug. 24, 2021

(54) METHOD FOR ACQUIRING CHANGED SYSTEM INFORMATION AND DEVICE SUPPORTING THE SAME

(71) Applicant: LG ELECTRONICS INC., Seoul (KR)

(72) Inventors: Oanyong Lee, Seoul (KR); Youngdae Lee, Seoul (KR); Sangwon Kim, Seoul (KR); Hongsuk Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 36 days.

(21) Appl. No.: 16/628,518

(22) PCT Filed: Aug. 9, 2018

(86) PCT No.: PCT/KR2018/009063
§ 371 (c)(1),
(2) Date: Jan. 3, 2020

(87) PCT Pub. No.: WO2019/031862
PCT Pub. Date: Feb. 14, 2019

(65) Prior Publication Data
US 2020/0162999 A1    May 21, 2020

Related U.S. Application Data

(60) Provisional application No. 62/543,410, filed on Aug. 10, 2017.

(51) Int. Cl.
*H04W 48/10* (2009.01)
*H04W 68/00* (2009.01)
*H04W 48/12* (2009.01)

(52) U.S. Cl.
CPC .................................. *H04W 48/10* (2013.01)

(58) Field of Classification Search
None
See application file for complete search history.

(56) References Cited

U.S. PATENT DOCUMENTS

| 9,338,760 | B2* | 5/2016 | Hegde | H04W 48/08 |
| 2013/0258938 | A1 | 10/2013 | Sagfors et al. | |
| 2015/0249952 | A1 | 9/2015 | Lee et al. | |
| 2019/0223094 | A1* | 7/2019 | Ingale | H04W 68/005 |

FOREIGN PATENT DOCUMENTS

| WO | 2009082076 | 7/2009 |
| WO | 2012147049 | 11/2012 |
| WO | 2017074042 | 5/2017 |

OTHER PUBLICATIONS

PCT International Application No. PCT/KR2018/009063, International Search Report dated Nov. 27, 2018, 2 pages.

* cited by examiner

*Primary Examiner* — Hong S Cho
(74) *Attorney, Agent, or Firm* — Lee Hong Degerman Kang Waimey

(57) ABSTRACT

Provided are a method of acquiring changed system information (SI) and a device supporting the method. According to one embodiment of the present invention, a method for acquiring changed SI in a wireless communication system includes: receiving a first SI message; receiving a notification of SI change; receiving an indication indicating a second SI message, which only contains system information blocks (SIBs) to be modified in the first SI message; and receiving the second SI message according to the indication.

12 Claims, 14 Drawing Sheets

METHOD FOR ACQUIRING CHANGED SYSTEM INFORMATION AND DEVICE SUPPORTING THE SAME

CROSS-REFERENCE TO RELATED APPLICATIONS

This application is the National Stage filing under 35 U.S.C. 371 of International Application No. PCT/KR2018/009063, filed on Aug. 9, 2018, which claims the benefit of U.S. Provisional Application No. 62/543,410, filed on Aug. 10, 2017, the contents of which are hereby incorporated by reference herein in their entirety.

BACKGROUND OF THE INVENTION

Field of the Invention

The present invention relates to a wireless communication system, and more particularly, to a method acquiring changed system information efficiently and a device supporting the same.

Related Art

Efforts have been made to develop an improved 5$^{th}$-generation (5G) communication system or a pre-5G communication system in order to satisfy a growing demand on radio data traffic after commercialization of a 4$^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, in the prior art, when (some of the) system information is changed, it first notifies the UE about the change via paging message and this notification may be done throughout a modification period. In the next modification period, the network transmits the updated system information.

SUMMARY OF THE INVENTION

According to a prior art, the UE has to acquire all the changed SI messages even though some SIBs included in the SI messages have not changed.

According to one embodiment of the present invention, a method for acquiring, by a user equipment (UE), changed system information in a wireless communication system is provided. The method may comprise: receiving a first SI message; receiving a notification of SI change; receiving an indication indicating a second SI message, which only contains system information blocks (SIBs) to be modified in the first SI message; and receiving the second SI message according to the indication.

The second SI message may be newly scheduled in a next period following a current modification period where the notification of SI change is transmitted.

A value tag of the first SI message configured in the previous period may be maintained in the next period.

The first SI message may contain plurality of SIBs, and at least one of the plurality of SIBs in the first SI message may be modified.

The modified SIBs in the second SI message may include the at least one of the plurality of SIBs in the first SI message.

The indication may be received via at least one of paging message and SIB 1.

According to another embodiment of the present invention, a method for transmitting, by a base station (BS), a second system information (SI) message in a wireless communication system is provided. The method may comprise: transmitting a first SI message; gathering system information blocks (SIBs) to be modified in the first SI message; transmitting an indication indicating the second SI message, which only contains the SIBs to be modified; and transmitting the second SI message according to the indication.

The second SI message may be newly scheduled in a next period following a current modification period where the notification of SI change is transmitted.

A value tag of the first SI message configured in the previous period may be maintained in the next period.

The indication is broadcasted via at least one of paging message and SIB 1.

According to another embodiment of the present invention, a user equipment (UE) in a wireless communication system is provided. The UE may comprise: a transceiver for transmitting or receiving a radio signal; and a processor coupled to the transceiver, the processor configured to: receive a first SI message; receive a notification of SI change; receive an indication indicating a second SI message, which only contains system information blocks (SIBs) to be modified in the first SI message; and receive the second SI message according to the indication.

The second SI message may be newly scheduled in a next period following a current modification period where the notification of SI change is transmitted.

A value tag of the first SI message configured in the previous period may be maintained in the next period.

The first SI message may contain plurality of SIBs, and at least one of the plurality of SIBs in the first SI message may be modified.

The modified SIBs in the second SI message may include the at least one of the plurality of SIBs in the first SI message.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
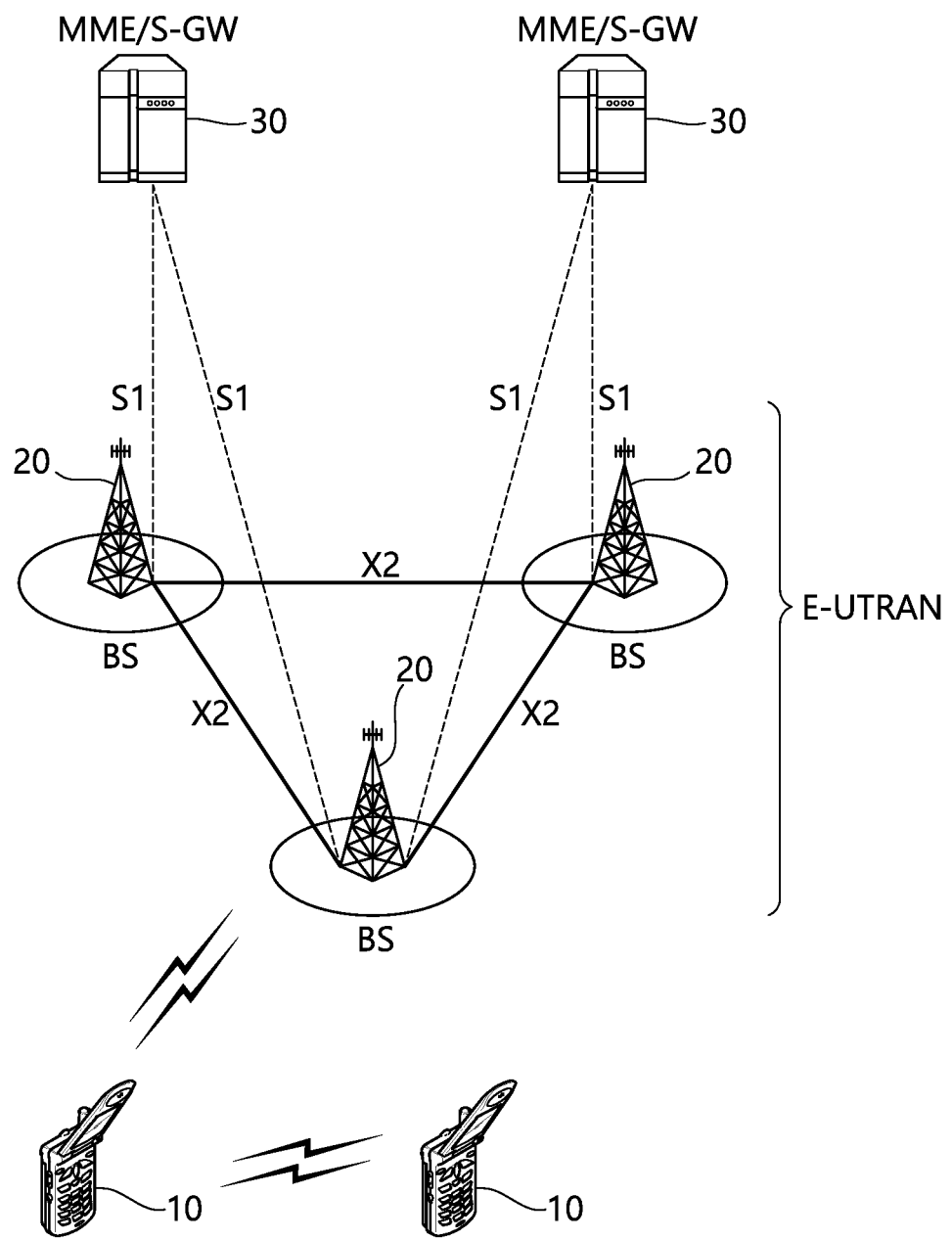
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
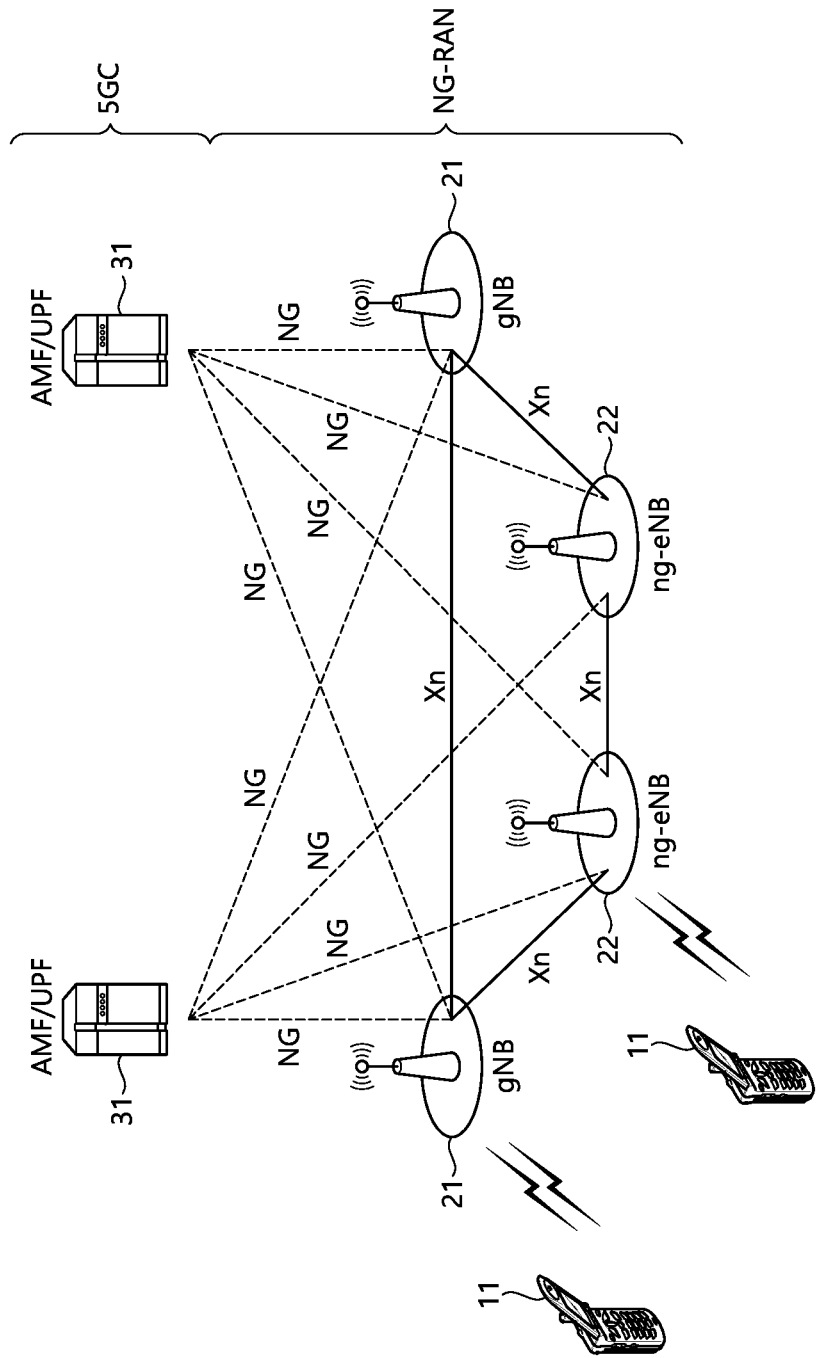
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional 5-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
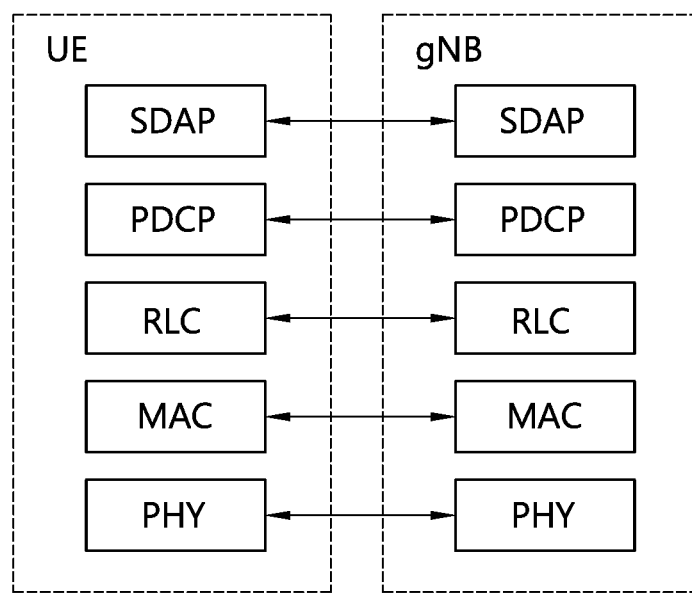
FIG. 3 shows a block diagram of a user plane protocol stack to which technical features of the present invention can be applied.
Figure 4:
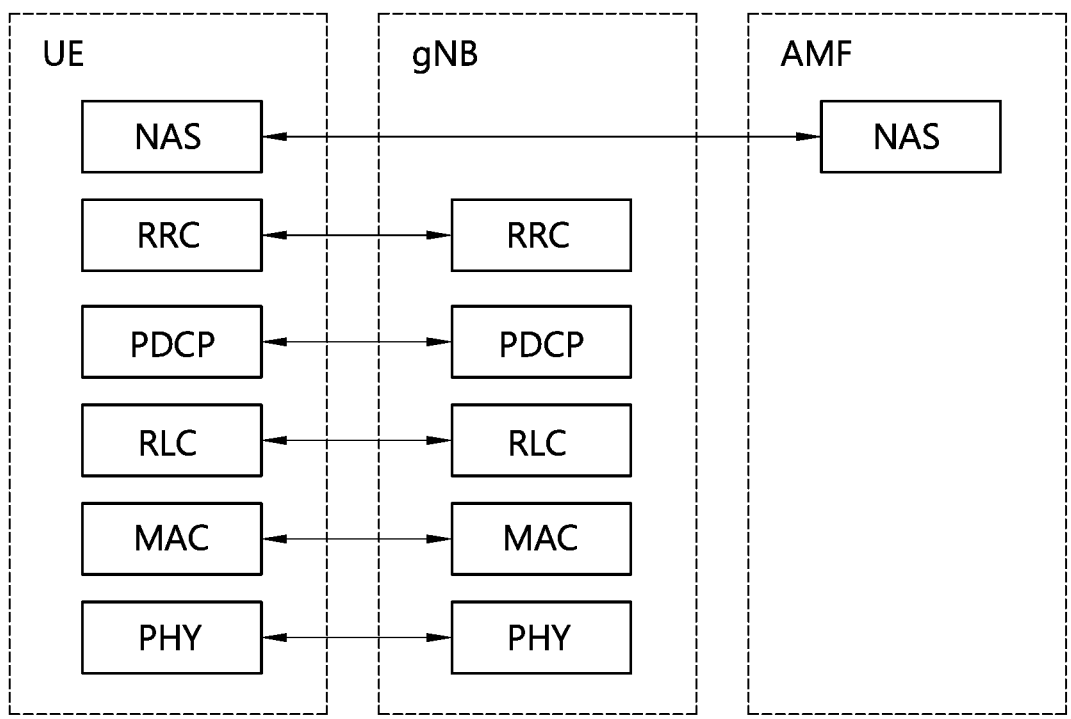
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 0.4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, System information is described.

System information is divided into a MasterInformationBlock (MIB) and a number of SystemInformationBlocks (SIBs). The MIB defines the most essential physical layer information of a cell required to receive further system information. SystemInformationBlockType1 contains information relevant when evaluating if a UE is allowed to access a cell and defines scheduling of other SIBs. Other SIBs are sets of related system information. For example, a specific SIB may include only information of a neighbor cell, and another SIB may include only information of an uplink radio channel used by the UE.

The MIB is mapped on a BCCH and carried on a BCH while all SIBs are mapped on the BCCH and dynamically carried on a DL-SCH where they can be identified through an SI-RNTI (system information radio network temporary identifier). The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

The SystemInformationBlockType1 uses a fixed schedule with a periodicity of 80 ms and repetitions made within 80 ms. The first transmission of the SystemInformationBlockType1 is scheduled in subframe #5 of radio frames for which the SFN mod 8=0, and repetitions are scheduled in subframe #5 of all other radio frames for which SFN mod 2=0. A single SI-RNTI is used to address the SystemInformationBlockType1 as well as all other SIBs. The SystemInformationBlockType1 configures an SI-window length and the transmission periodicity for all other SIBs, as described in Table 1.

Scheduling of all other SIBs is flexible and indicated by the SystemInformationBlockType1. The SIBs are transmitted within periodically occurring SI-windows using dynamic scheduling. Each SIB is associated with a SI-window, and SI-windows of different SIBs do not overlap. That is, within one SI-window only the corresponding SIB is transmitted. The length of the SI-window is common for all SIBs, and is configurable. Within the SI-window, the corresponding SIB can be transmitted a number of times in any subframe other than Multicast-Broadcast Single Frequency Network (MBSFN) subframes, uplink subframes in time domain duplex (TDD), and subframe #5 of radio frames for which SFN mod 2=0. The UE acquires the detailed time-domain scheduling (and other information, e.g. frequency-domain scheduling, used transport format) from decoding an SI-RNTI on a PDCCH.

The eNB may schedule DL-SCH transmissions concerning logical channels other than BCCH in the same subframe as used for the BCCH. The minimum UE capability restricts the BCCH mapped to DL-SCH e.g. regarding the maximum rate. System information may also be provided to the UE by means of dedicated signaling e.g. upon handover.

Change of system information only occurs at specific radio frames, i.e. concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information.

Figure 5:
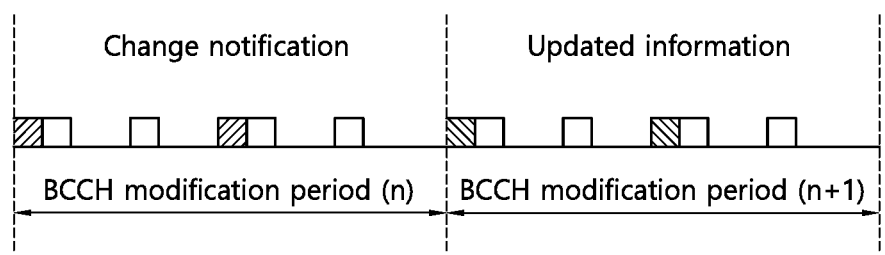
FIG. 5 shows a change of change of system information.

FIG. 5 shows a change of change of system information.

When a network changes (some of the) system information, it first notifies UEs about this change, i.e. this may be done throughout a modification period. In the next modification period, the network transmits updated system information. Referring to FIG. 5, different hatchings indicate different system information. Upon receiving a change notification, the UE acquires new system information immediately from the start of the next modification period. The UE applies the previously acquired system information until the UE acquires the new system information.

A paging message is used to inform UEs in RRC_IDLE and UEs in RRC_CONNECTED about a system information change. If the UE receives a paging message including systemInfoModification, it knows that the system information will change at the next modification period boundary. Although the UE may be informed about changes in the system information, no further details are provided e.g. regarding which system information will change, except if systemInfoValueTagSI is received by BL UEs or UEs in CE.

For BL UEs or UEs in CE or NB-IoT UEs, the change of specific SI message can additionally be indicated by a SI message specific value tag systemInfoValueTagSI. If systemInfoValueTag included in the SystemInformationBlockType1-BR (or MasterInformationBlock-NB in NB-IoT) is different from the one of the stored system information and if systemInfoValueTagSI is included in the SystemInformationBlockType1-BR (or SystemInformationBlockType1-NB in NB-IoT) for a specific SI message and is different from the stored one, the UE shall consider this specific SI message to be invalid.

The SystemInformationBlockType1 includes a value tag, systemInfoValueTag, that indicates if a change has occurred in the system information. The UE may use systemInfoValueTag, e.g. upon return from out of coverage, to verify if the previously stored system information is still valid. Additionally, the UE considers the stored system information to be invalid after 3 hours from the moment it was successfully confirmed as valid, unless specified otherwise.

The UE verifies that the stored system information remains valid by either checking systemInfoValueTag in the SystemInformationBlockType1 after the modification period boundary, or attempting to find systemInfoModification indication at least modificationPeriodCoeff times during the modification period in case no paging message is received, in every modification period. If no paging message is received by the UE during a modification period, the UE may assume that no change of the system information will occur at the next modification period boundary. If the UE in RRC_CONNECTED, during the modification period, receives one paging message, it may deduce from the presence/absence of systemInfoModification whether a change of the system information will occur in the next modification period or not.

Figure 6:
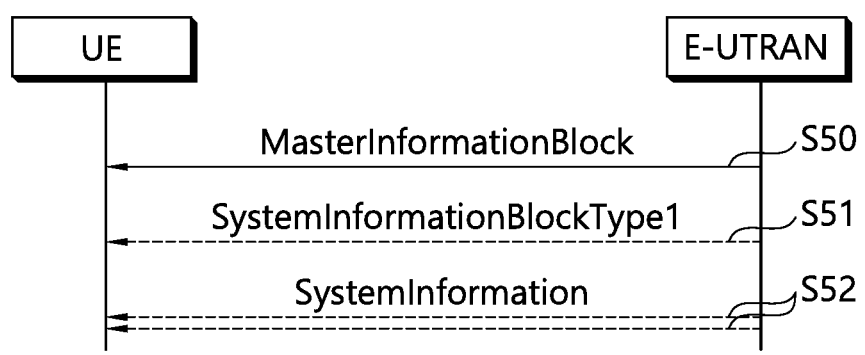
FIG. 6 shows a system information acquisition procedure.

FIG. 6 shows a system information acquisition procedure.

A UE applies a system information acquisition procedure to acquire an access stratum (AS)- and non-access stratum (NAS)-system information that is broadcasted by an E-UTRAN. The system information acquisition procedure applies to UEs in RRC_IDLE and UEs in RRC_CONNECTED.

Referring to FIG. 6, at step S50, a UE receives a MIB from an E-UTRAN. At step S51, the UE receives a SystemInformationBlockType1 from the E-UTRAN. At step S52, the UE receives system information from the E-UTRAN.

Generally, an MIB may be transmitted using relatively narrow bandwidth while all other SIBs may be transmitted using relatively wide bandwidth. For example, an MIB may be transmitted through 3 MHz bandwidth among 20 MHz bandwidth of a cell, while all other SIBs may be transmitted through whole 20 MHz of the cell.

Hereinafter, system information in NR is described.

System information is divided into minimum SI and other SI. Minimum SI is periodically broadcast. The minimum SI comprises basic information required for initial access to a cell and information for acquiring any other SI broadcast periodically or provisioned via on-demand basis. The minimum SI includes at least SFN, list of PLMN, Cell ID, cell camping parameters, RACH parameters. If network allows on demand mechanism, parameters required for requesting other SI-block(s) (if any needed, e.g. RACH preambles for request) shall be included in minimum SI. The other SI encompasses everything not broadcast in the minimum SI. Cell-reselection neighbouring cell information is considered as other SI. The other SI may either be broadcast, or provisioned in a dedicated manner, either triggered by the network or upon request from the UE.

Figure 7:
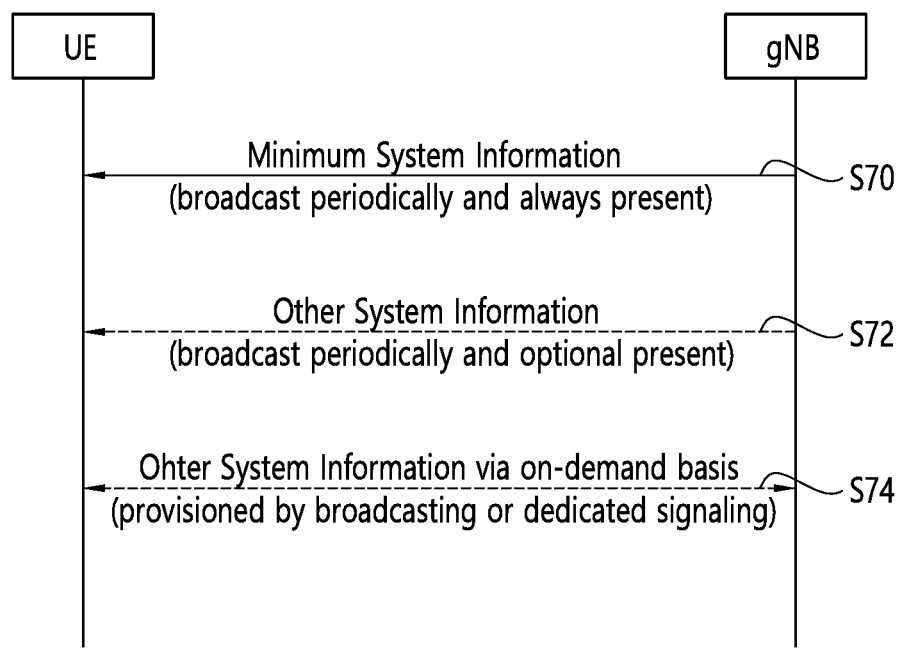
FIG. 7 shows as high level concept of on-demand SI provisioning.

FIG. 7 shows as high level concept of on-demand SI provisioning. Referring FIG. 7, the gNB may transmit minimum SI (S70). The other SI may be broadcasted (S72) or may be provisioned in a dedicated manner (S74).

In specific, a UE can request one or more SIs or all SIs (e.g. SIBs) in single request. For the other SI required by the UE, before the UE sends the other SI request the UE needs to know whether it is available in the cell and whether it is broadcast or not. This can be done by checking the minimum SI which provides the scheduling information for the other SI including SIB type, validity information, SI periodicity and SI-window information based on LTE. The scheduling information in minimum SI includes an indicator whether the concerned SI-block is periodically broadcasted or provided on demand. If minimum SI indicates that a SIB is not broadcasted, then UE does not assume that this SIB is a periodically broadcasted in its SI-window at every SI periodicity. Therefore the UE may send an SI request to receive this SIB. After sending the SI request, for receiving the requested SIB, UE monitors the SI window of requested SIB in one or more SI periodicities of that SIB.

Figure 8:
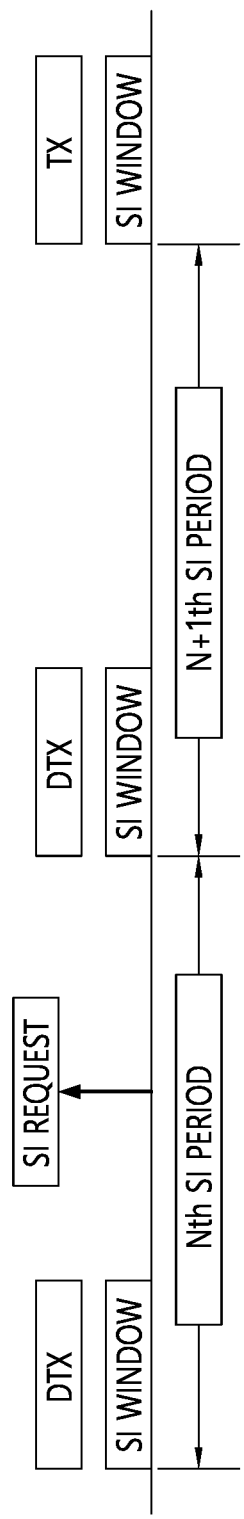
FIG. 8 shows SI scheduling frame work.

FIG. 8 shows SI scheduling frame work.

Referring FIG. 8, if SI request is received for a SIB in its Nth SI period, then requested SIB is provided at/from the next SI transmission of the concerned SI message. The UE in RRC_IDLE or RRC_INACTIVE should be able to request the other SI without requiring a state transition. For the UE in RRC_CONNECTED, dedicated RRC signaling can be used for the request and delivery of the other SI. The other SI may be broadcast at configurable periodicity and for certain duration. PWS information can be classified into the other SI. It is network decision whether the other SI is broadcast or delivered through dedicated UE specific RRC signaling. Each cell on which the UE is allowed to camp broadcasts at least some contents of the minimum SI, while there may be cells in the system on which the UE cannot camp and do not broadcast the minimum SI. For a cell/frequency that is considered for camping by the UE, the UE should not be required to acquire the minimum SI from the other cell/frequency layer. This does not preclude the case that the UE applies stored SI from previously visited cell(s). If the UE cannot determine the full minimum SI of a cell (by receiving from that cell or from valid stored SI from previous cells), the UE shall consider that cell as barred. It is desirable for the UE to learn very quickly that this cell cannot be camped on.

In the LTE network, when (some of the) system information (SI) is changed, network may first notify the UE about the change via paging message. This notification may be done throughout a modification period. In the next modification period, the network may transmit the updated system information. If the i.e. systemInfoModification is set TRUE in paging message, the UE may know that the system information will change at the next modification period boundary.

According to the prior art, SystemInfoValueTagSI for each SI message is used for determining whether the corresponding SI message is changed or not. However, using SystemInfoValueTagSI included in SIB1, UE can realize which SI message has changed using, but may not know which system information block (SIB) has changed. As each SI message contains two or more SIBs, the UE has to acquire all the changed SI messages even though some SIBs included in the SI messages have not changed.

Hereinafter, acquiring changed system information according to an embodiment of present invention is described to solve the problem. According to an embodiment of present invention, a new SI message(s) is created and only modified SIBs may be gathered into the new SI message(s) so that the UE which has received notification of system information change only needs to acquire newly added SI message(s). Existing SIs shall be scheduled continuously because there might be new UEs trying camping on the cell so that they may need to acquire entire system information.

Figure 9:
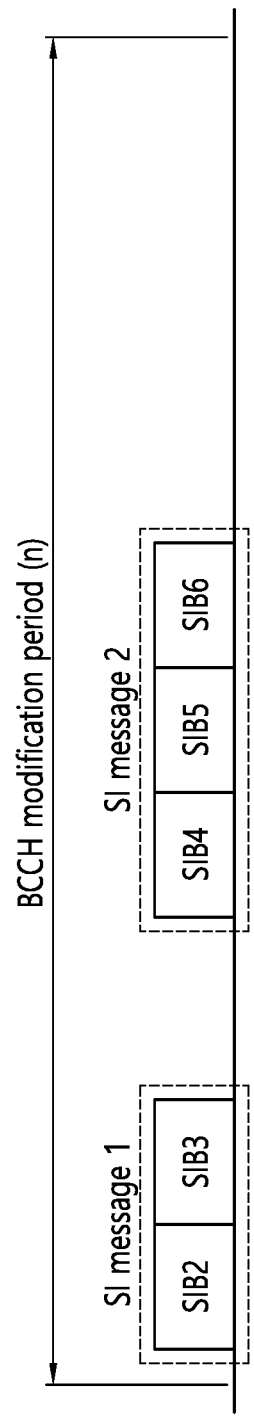
FIG. 9 shows SI messages received in BCCH modification period.
Figure 10:
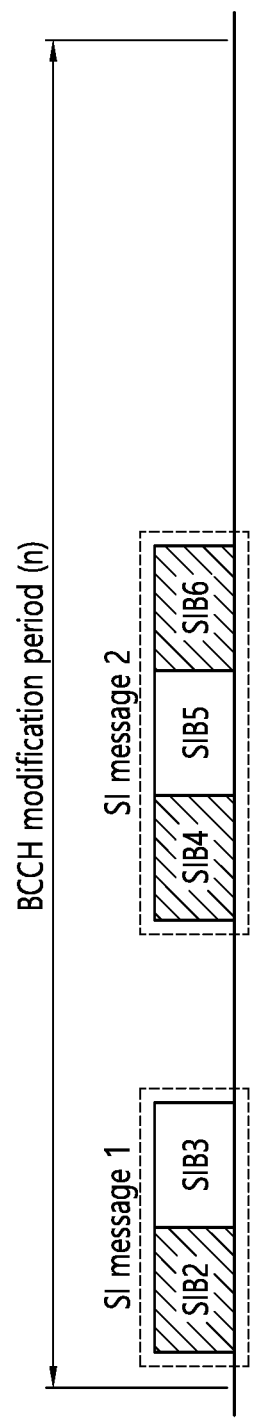
FIG. 10 shows modified SIBs in SI messages received in BCCH modification period.
Figure 11:
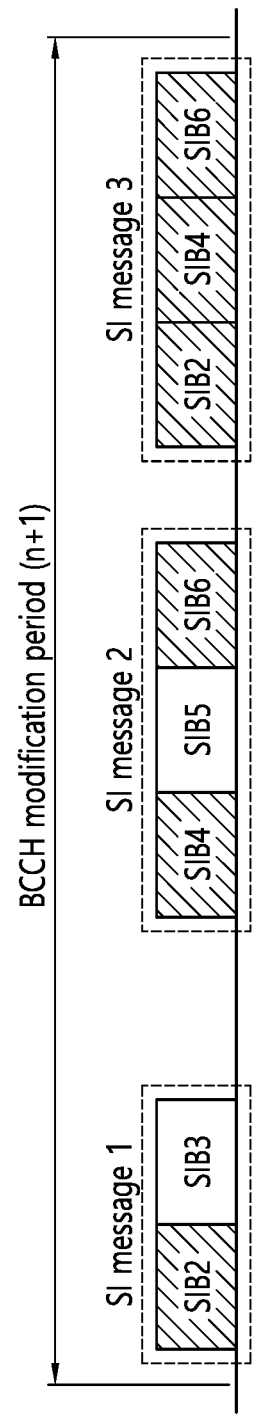
FIG. 11 shows a new SI message scheduled in next BCCH modification period according to an embodiment of present invention.

FIG. 9-11 show how to optimize the procedure of acquisition of changed system information according to an embodiment of present invention.

FIG. 9 shows SI messages received in BCCH modification period (n). Referring to FIG. 9, SI message 1 and SI message 2 are being broadcasted in the period (n). The SI message 1 may include SIB 2 and SIB3. The SI message 2 may include SIB4, SIB 5 and SIB 6.

FIG. 10 shows modified SIBs in SI messages received in BCCH modification period (n). Referring to FIG. 10, SIB 2, SIB 4 and SIB 6 may be changed. In the current LTE network, the UE has to acquire SI message 1 and SI message 2 entirely in the next modification period (n+1) even though SIB 3 and SIB 5 are not changed.

FIG. 11 shows a new SI message scheduled in next BCCH modification period (n+1) according to an embodiment of present invention. Referring to FIG. 11, SI message 3 has been newly scheduled and only modified SIBs (i.e. SIB2, 4, 6) are contained in the new SI message. Now any UE which has received notification of system information modification in the previous modification period (n) just needs to acquire SI message 3, not SI message 1 and SI message 2.

On the other hands, a UE newly camping on the cell will acquire SI message 1 and SI message 2, not SI message 3. That is, the UE which is camped on the cell in the next BCCH modification period (n+1) may need to acquire the SI message 1 and SI message 2, because the newly camping UE does not have the SI message 1 and SI message 2.

According to an embodiment of present invention, a value tag may be configured per SI messages. The value tag of existing SI messages (i.e. SI message 1 and SI message 2) shall be kept constant though the containing SIBs were changed. If their value tag of SI message 1 and SI message 2 is also increased, it may occur confusion for a UE only required to acquire SI message 3 because difference of value tag means the SI has changed. If then, the UE has to receive the corresponding SI message(s). By keeping same value tag of SI message 1 and SI message 2, the UE may only acquire SI message 3 and the other UEs who are newly camping on the cell will read the SI message 1 and SI message 2. Further, the value tag may be configured per SIBs in the SI messages.

In this case, the value tag of SIBs in existing SI messages shall be kept constant in the next period, though the containing SIBs were changed, so that the UE does not need to receive the existing SI messages.

An indication parameter shall be added to inform the UE that which SI message is only containing the modified SIBs. In other words, the indication parameter may be configured to indicate the new SI message. According to the indication parameter, the UEs which only needs reception of modified SIBs may acquire the corresponding SI message(s). On the other hand, the UEs newly camping on the cell will acquire rest of the SI message(s). There are two possible messages to contain this indicator parameter, as follow:

1. Paging Message

The indicator may be optionally contained in the paging message, so whenever i.e. systemInfoModification is set TRUE, the indicator informs which SI message(s) will contain only the modified SIBs. In the next modification period, the UE may just acquire the indicated SI message(s) whose scheduling information is included in SIB1.

2. SIB1

Whenever the UE has received notification of system information change, the UE shall acquire SIB1 in order to know the scheduling information and valuetag of each SI message. Before reading the information, the indicator is contained in the SIB1 so that the UE only needs to read necessary scheduling information.

Figure 12:
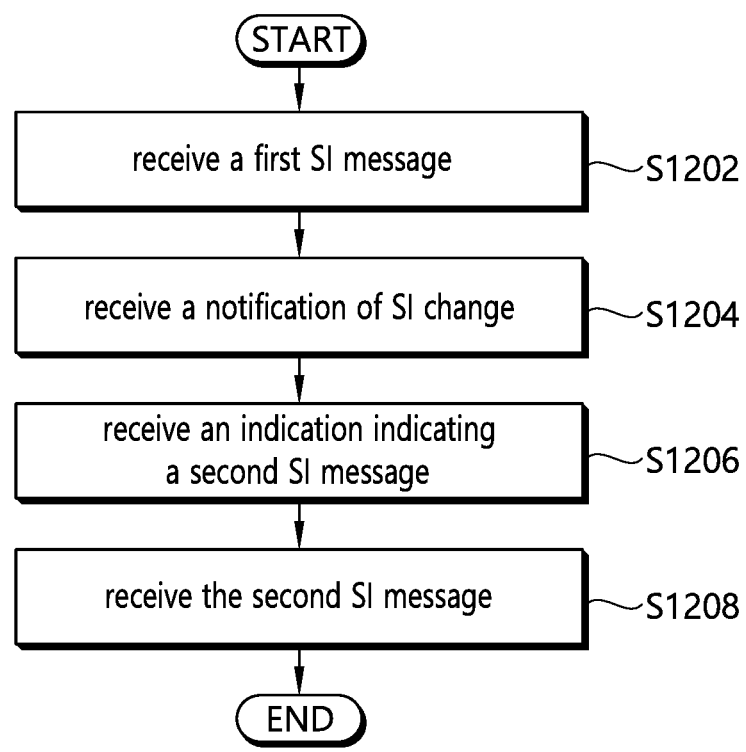
FIG. 12 shows an example of a method for acquiring changed system information according to an embodiment of the present invention.

FIG. 12 shows an example of a method for acquiring changed system information according to an embodiment of the present invention.

In step S1202, the UE may receive a first SI message. A value tag of the first SI message configured in the previous period is maintained in the next period. The first SI message may contain plurality of SIBs, and at least one of the plurality of SIBs in the first SI message may be modified.

In step S1204, the UE may receive a notification of SI change. The indication may be received via at least one of paging message and SIB 1.

In step S1206, the UE may receive an indication indicating a second SI message, which only contains system information blocks (SIBs) to be modified in the first SI message. The second SI message may be newly scheduled in a next period following a current modification period where the notification of SI change is transmitted. The modified SIBs in the second SI message may include the at least one of the plurality of SIBs in the first SI message.

In step S1208, the UE may receive the second SI message according to the indication.

Figure 13:
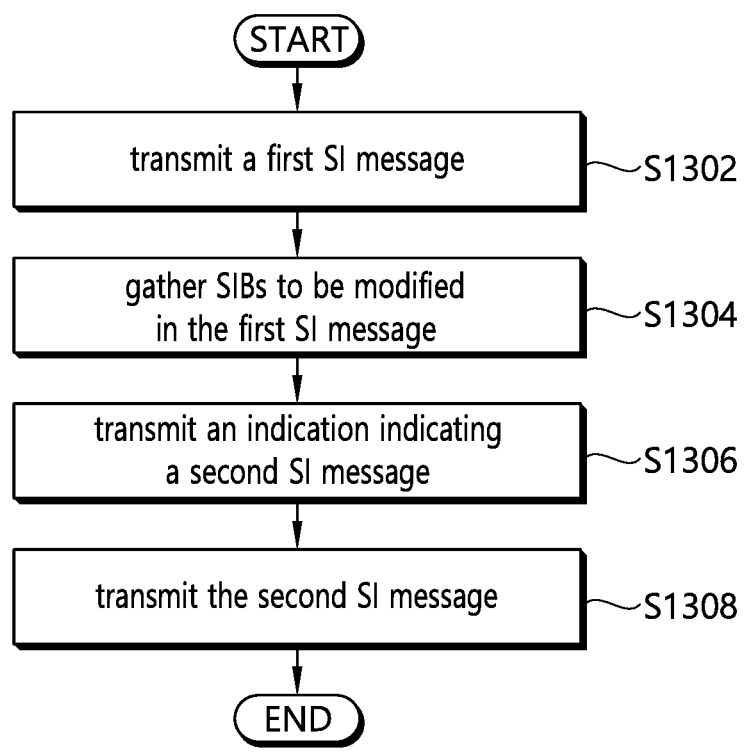
FIG. 13 shows an example of a method for broadcasting changed system information according to an embodiment of the present invention.

FIG. 13 shows an example of a method for broadcasting changed system information according to an embodiment of the present invention.

In step S1302, the BS may transmit a first SI message. A value tag of the first SI message configured in the previous period is maintained in the next period In step S1304, the BS may gather system information blocks (SIBs) to be modified in the first SI message.

In step S1306, the BS may transmit an indication indicating the second SI message, which only contains the SIBs to be modified. The second SI message is newly scheduled in a next period following a current modification period where the notification of SI change is transmitted. The indication is broadcasted via at least one of paging message and SIB 1.

In step S1308, the BS may transmit the second SI message according to the indication.

Figure 14:
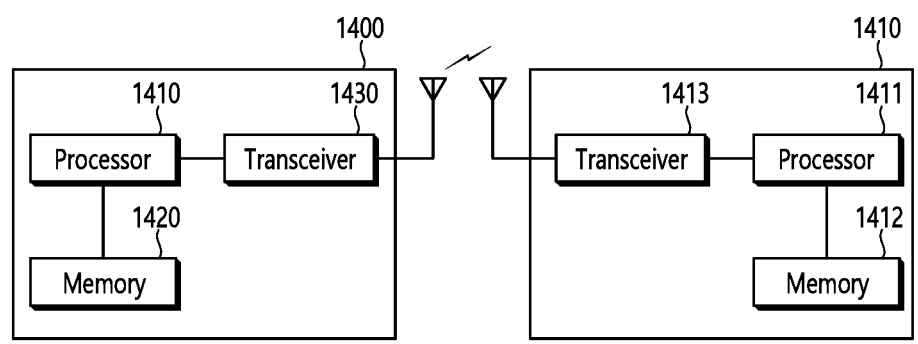
FIG. 14 shows a communication system to implement an embodiment of the present invention.

FIG. 14 shows a communication system to implement an embodiment of the present invention.

A UE 1400 includes a processor 1401, a memory 1402, and a transceiver 1403. The memory 1402 is coupled to the processor 1401, and stores a variety of information for driving the processor 1401. The transceiver 1403 is coupled to the processor 1401, and transmits and/or receives a radio signal. The processor 1401 implements the proposed functions, procedures, and/or methods. In the aforementioned embodiments, an operation of the first network node may be implemented by the processor 1401.

A network node 1410 includes a processor 1411, a memory 1412, and a transceiver 1413. The memory 1412 is coupled to the processor 1411, and stores a variety of information for driving the processor 1411. The transceiver 1413 is coupled to the processor 1411, and transmits and/or receives a radio signal. The processor 1411 implements the proposed functions, procedures, and/or methods. In the aforementioned embodiments, an operation of the second network node 1410 may be implemented by the processor 1411.

The processors 1411 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
   receiving, from a network in a first modification period, at least one system information (SI) message including a plurality of system information blocks (SIBs);
   receiving, from the network, a paging message comprising an SI modification indication indicating that one or more of the plurality of SIBs are to be modified;
   receiving, from the network, an SI message indicator indicating a first SI message which includes only one or more first SIBs that are modified among the plurality of SIBs and excludes one or more second SIBs that are not modified among the plurality of SIBs; and
   receiving, from the network in a second modification period next to the first modification period, the first SI message based on the SI modification indication and the SI message indicator,
   wherein the first SI message and a second SI message including the one or more first SIBs and the one or more second SIBs are transmitted from the network in the second modification period, and
   wherein the first SI message is received without receiving the second SI message in the second modification period based on the SI message indicator.

2. The method of claim 1, wherein the first SI message is newly scheduled in the second modification period.

3. The method of claim 1, wherein a value tag of the at least one SI message configured in a third modification period previous to the first modification period is maintained in the second modification period.

4. The method of claim 1, wherein the SI message indicator is received via at least one of the paging message or SIB 1.

5. The method of claim 1, wherein the UE communicates with at least one of a mobile terminal, a network or autonomous vehicles other than the UE.

6. A method performed by a base station (BS) in a wireless communication system, the method comprising:
   transmitting, in a first modification period, at least one system information (SI) message including a plurality of system information blocks (SIBs);
   transmitting a paging message comprising an SI modification indication indicating that one or more of the plurality of SIBs are to be modified;
   transmitting an SI message indicator indicating a first SI message which includes only one or more first SIBs that are modified among the plurality of SIBs and excludes one or more second SIBs that are not modified among the plurality of SIBs; and
   transmitting, in a second modification period next to the first modification period, the first SI message and a second SI message including the one or more first SIBs and the one or more second SIBs based on the SI modification indication,
   wherein the first SI message is received without receiving the second SI message in the second modification period based on the SI message indicator.

7. The method of claim 6, wherein the first SI message is newly scheduled in the second modification period.

8. The method of claim 6, wherein a value tag of the at least one SI message configured in a third modification period previous to the first modification period is maintained in the second modification period.

9. The method of claim 6, wherein the SI message indicator is transmitted via at least one of the paging message or SIB 1.

10. A user equipment (UE) in a wireless communication system, the UE comprising:
    a transceiver;
    a memory; and
    at least one processor operatively coupled to the transceiver and the memory,
    wherein the at least one processor is configured to control the transceiver to:

receive, from a network in a first modification period, at least one system information (SI) message including a plurality of system information blocks (SIBs);
receive, from the network, a paging message comprising an SI modification indication indicating that one or more of the plurality of SIBs are to be modified;
receive, from the network, an SI message indicator indicating a first SI message which includes only one or more first SIBs that are modified among the plurality of SIBs and excludes one or more second SIBs that are not modified among the plurality of SIBs; and
receive, from the network in a second modification period next to the first modification period, the first SI message based on the SI modification indication and the SI message indicator,
wherein the first SI message and a second SI message including the one or more first SIBs and the one or more second SIBs are transmitted from the network in the second modification period, and
wherein the first SI message is received without receiving the second SI message in the second modification period based on the SI message indicator.

11. The UE of claim 10, wherein the first SI message is newly scheduled in the second modification period.

12. The UE of claim 10, wherein a value tag of the at least one SI message configured in a third modification period previous to the first modification period is maintained in the second modification period.

* * * * *